US012578287B2

(12) United States Patent
Diop et al.

(10) Patent No.: US 12,578,287 B2
(45) Date of Patent: Mar. 17, 2026

(54) METHOD FOR MEASURING THE OPTICAL QUALITY OF A GIVEN REGION OF A GLAZING UNIT, ASSOCIATED MEASURING DEVICE

(71) Applicant: SAINT-GOBAIN GLASS FRANCE, Courbevoie (FR)

(72) Inventors: Daouda Keita Diop, Clichy (FR); Adrien Carlu, Amiens (FR); Théo Rybarczyk, Margny les Compiegne (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 358 days.

(21) Appl. No.: 17/781,232

(22) PCT Filed: Dec. 4, 2020

(86) PCT No.: PCT/EP2020/084606
§ 371 (c)(1),
(2) Date: May 31, 2022

(87) PCT Pub. No.: WO2021/110901
PCT Pub. Date: Jun. 10, 2021

(65) Prior Publication Data
US 2022/0412897 A1 Dec. 29, 2022

(30) Foreign Application Priority Data
Dec. 6, 2019 (FR) ........................................ 1913869

(51) Int. Cl.
*G01N 21/958* (2006.01)
*G01J 9/02* (2006.01)
*G01M 11/02* (2006.01)

(52) U.S. Cl.
CPC .............. *G01N 21/958* (2013.01); *G01J 9/02* (2013.01); *G01M 11/0228* (2013.01);
(Continued)

(58) Field of Classification Search
CPC . G01N 21/958; G01N 2021/9586; G01J 9/00; G01J 9/02; G01J 2009/0238;
(Continued)

(56) References Cited

U.S. PATENT DOCUMENTS

| | | | | |
|---|---|---|---|---|
| 4,310,242 A | * | 1/1982 | Genco | .................... G01M 11/00 356/128 |
| 4,453,827 A | | 6/1984 | Taboada | |

(Continued)

FOREIGN PATENT DOCUMENTS

| | | | | |
|---|---|---|---|---|
| DE | 102013020417 A1 | * | 7/2014 | ........... G01N 21/958 |
| EP | 1 582 854 A2 | | 10/2005 | |

(Continued)

OTHER PUBLICATIONS

Jean-Christophe F Chanteloup, Mathieu Cohen, "Compact high resolution four wave lateral shearing interferometer," Proc. SPIE 5252, Optical Fabrication, Testing, and Metrology, (Feb. 26, 2004); https://doi.org/10.1117/12.513739 (Year: 2004).*

(Continued)

*Primary Examiner* — Tarifur R Chowdhury
(74) *Attorney, Agent, or Firm* — Pillsbury Winthrop Shaw Pittman LLP

(57) ABSTRACT
A method for measuring the optical quality of a given region of a glazing of a road or rail vehicle, the region being intended to be positioned in the optical path of an image-acquiring device, the measuring method being implemented by a measuring device including an emitter and a wavefront analyzer, the measuring method including emitting, with the emitter, a beam of light rays in the direction of the given
(Continued)

region, analyzing, with the wavefront analyzer, the wavefront of the light rays transmitted by the given region, including generating a wavefront-error map, and determining, on the basis of the wavefront-error map, at least one optical-defect map, of any optical defects present in the region of the glazing.

14 Claims, 7 Drawing Sheets

(52) U.S. Cl.
CPC .... *G01M 11/0264* (2013.01); *G01M 11/0271* (2013.01); *G01M 11/0278* (2013.01); *G01N 2021/9586* (2013.01)

(58) Field of Classification Search
CPC ............ G01M 11/02; G01M 11/0228; G01M 11/0264; G01M 11/0271; G01M 11/0278; G01M 11/0292
See application file for complete search history.

(56) References Cited

U.S. PATENT DOCUMENTS

| | | | |
|---|---|---|---|
| 5,233,174 A | 8/1993 | Zmek | |
| 2003/0160968 A1 | 8/2003 | Deck et al. | |
| 2004/0041978 A1 | 3/2004 | Neal et al. | |
| 2005/0105044 A1* | 5/2005 | Warden | .............. G01M 11/0235 351/159.08 |
| 2005/0219522 A1* | 10/2005 | Jones | .................... G01M 11/00 356/239.1 |
| 2011/0153248 A1* | 6/2011 | Gu | ..................... G01M 11/0292 702/81 |
| 2014/0193598 A1* | 7/2014 | Traser | .................... C09J 133/02 428/41.3 |
| 2015/0177160 A1 | 6/2015 | Zoeller | |
| 2016/0363531 A1 | 12/2016 | Sugimoto | |
| 2018/0188016 A1 | 7/2018 | Cheng et al. | |
| 2019/0337269 A1 | 11/2019 | Sartenaer et al. | |
| 2021/0325670 A1* | 10/2021 | Chen | ......................... G01J 9/00 |

FOREIGN PATENT DOCUMENTS

| | | | | | |
|---|---|---|---|---|---|
| FR | 3 077 761 A1 | | 8/2019 | | |
| JP | 2004043212 A | * | 2/2004 | | |
| JP | 2004340693 A | * | 12/2004 | | |
| JP | 2008116409 A | * | 5/2008 | .......... G01N 21/412 |
| JP | 2018521337 A | * | 8/2018 | | |
| KR | 20030067993 A | * | 8/2003 | | |
| WO | WO-2018090951 A1 | * | 5/2018 | ............. G01B 9/021 |
| WO | WO 2019/150021 A1 | | 8/2019 | | |

OTHER PUBLICATIONS

International Search Report as issued in International Patent Application No. PCT/EP2020/084606, dated Mar. 2, 2021.
Second Office Action as issued in Chinese Patent Application No. 202080005712.6, dated Sep. 29, 2023.
Zhou, H., *Micro-Electro-Mechanical Systems*, Bejing; National Defense Industry Press, Version 1, publication date: Jan. 31, 2010; (English translation of relevant portions is enclosed).
Wang, Y., et al., *Optometry*, Beijing; People's Military Medical Press, Version 1, publication date: Aug. 31, 2008; (English translation of relevant portions is enclosed).

\* cited by examiner

[Fig. 1]
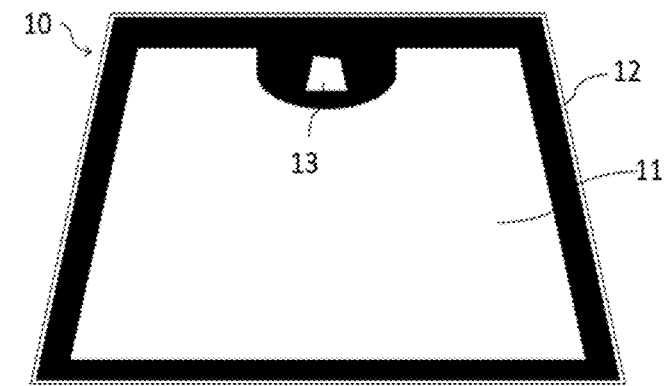
[Fig. 2]
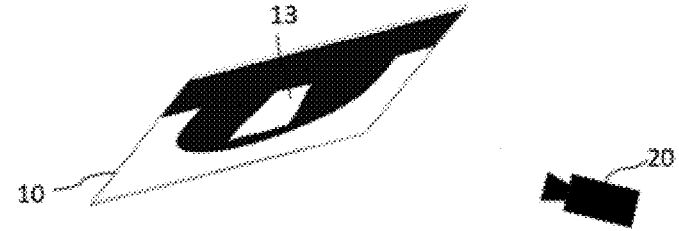
[Fig. 3]
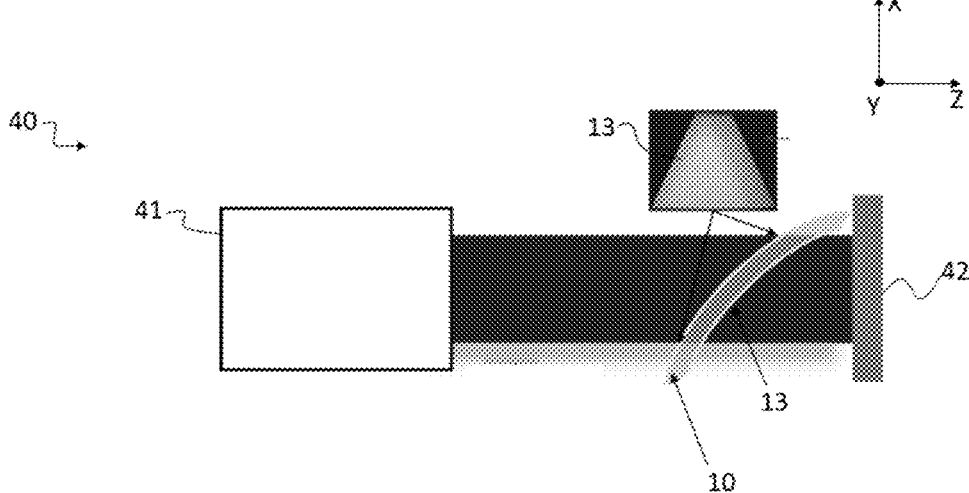

[Fig. 3']
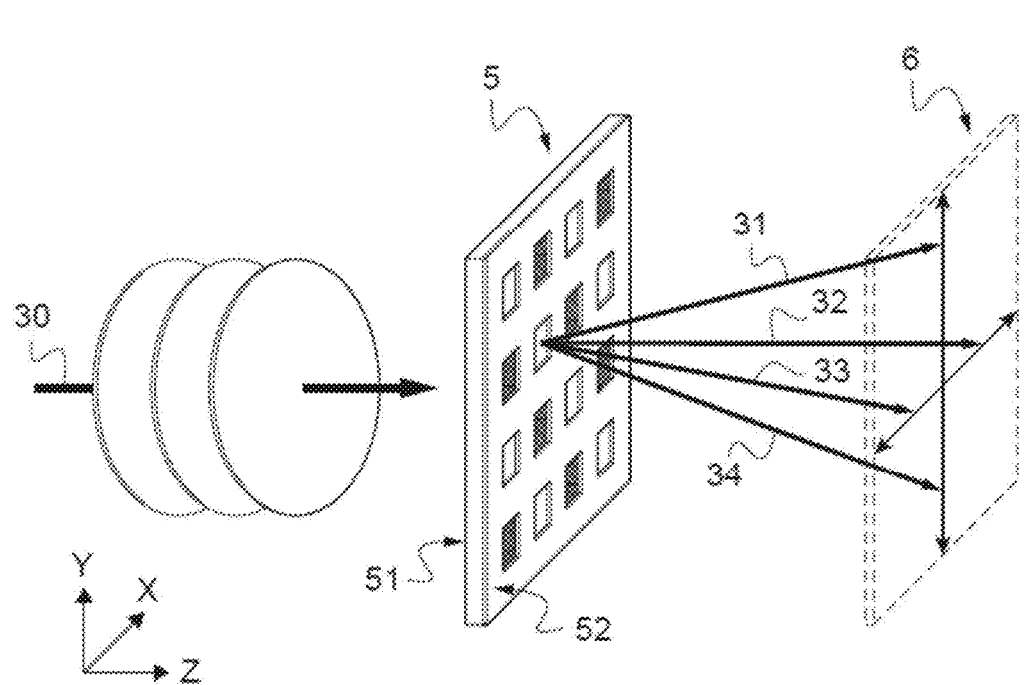

[Fig. 4]

[Fig. 5a]
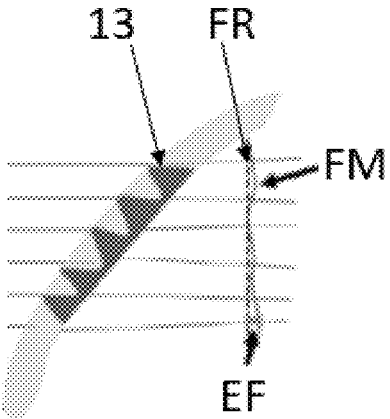
[Fig. 5b]
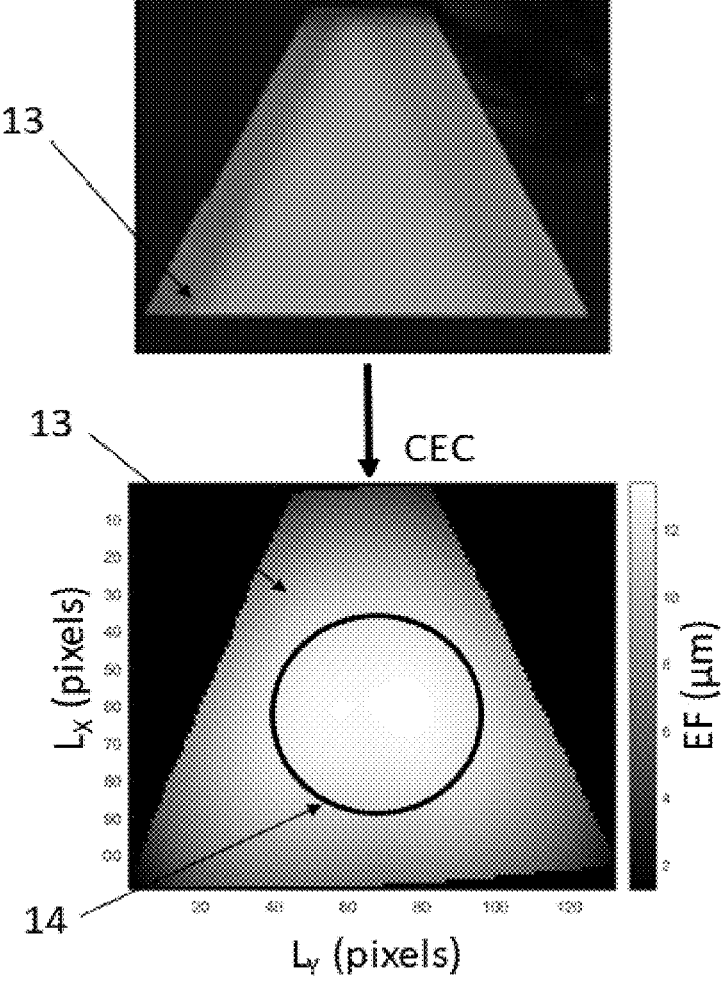

[Fig. 6]
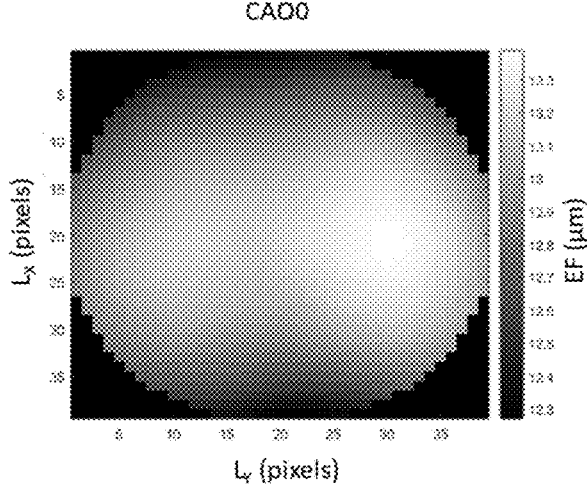
[Fig. 7a]
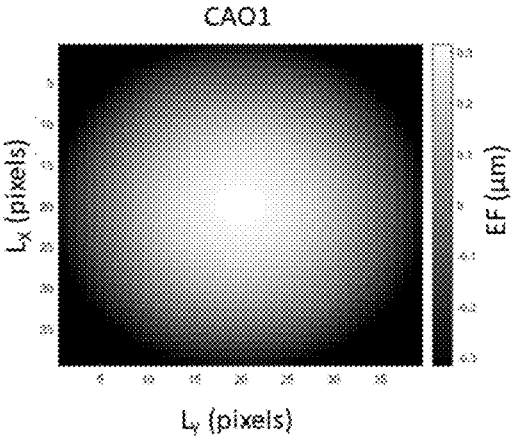 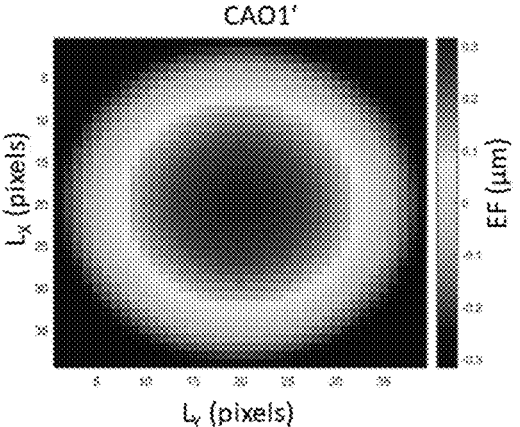
[Fig. 7b]
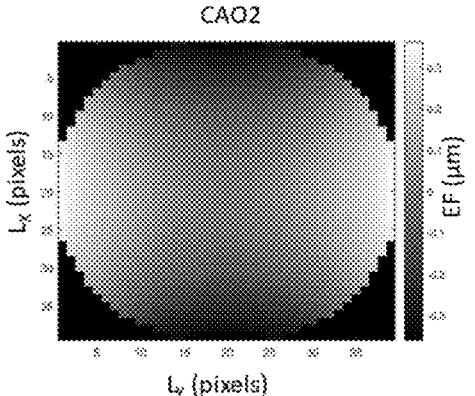 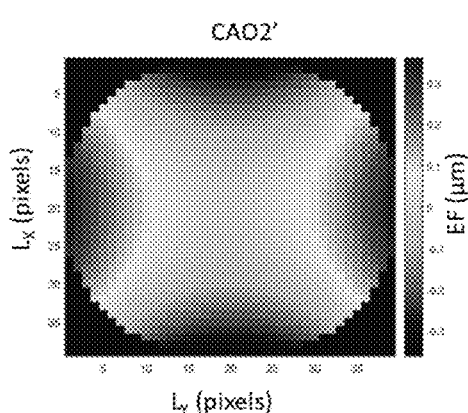

[Fig. 7c]
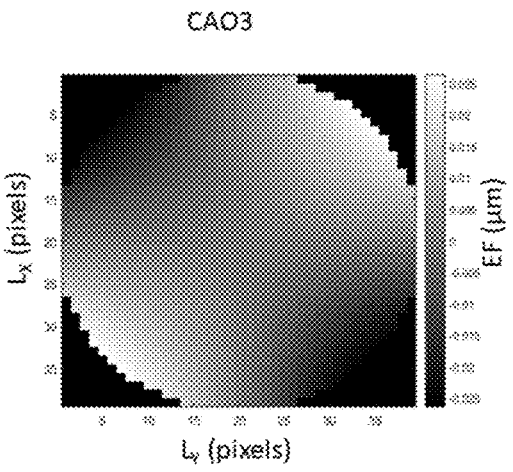
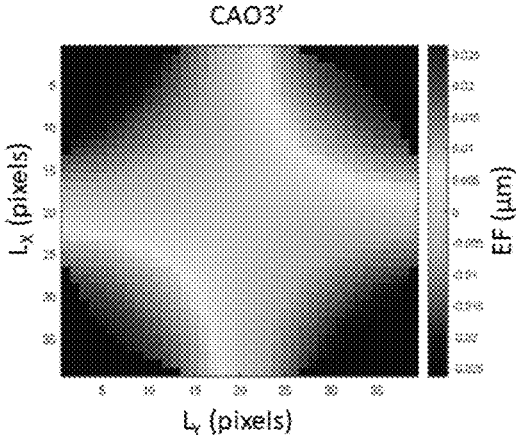
[Fig. 7d]
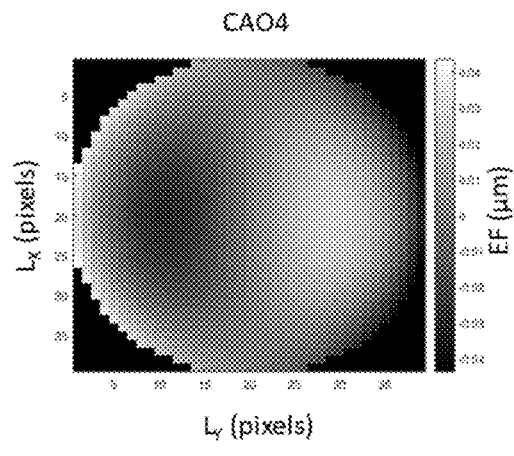
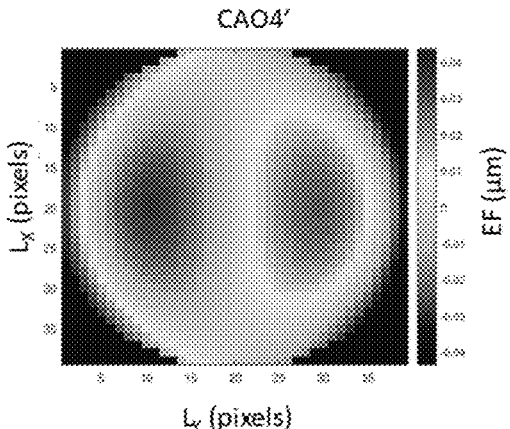
[Fig. 7e]
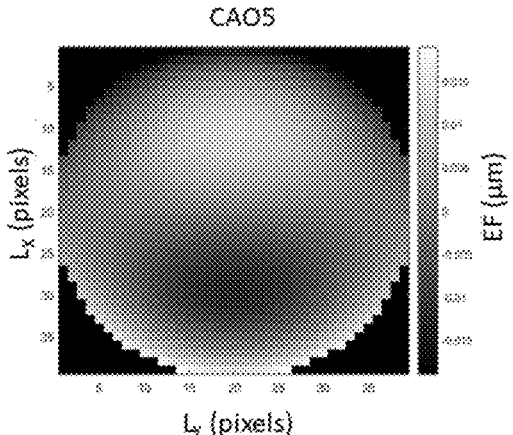
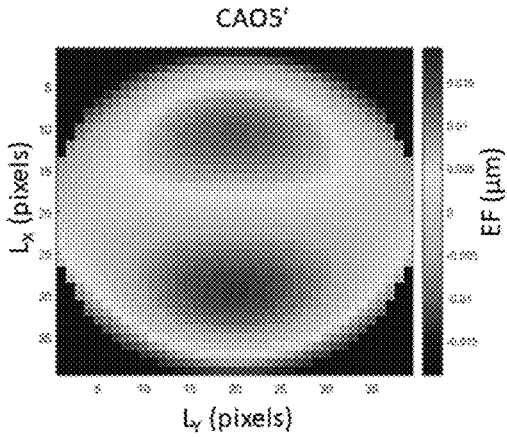

[Fig. 7f]
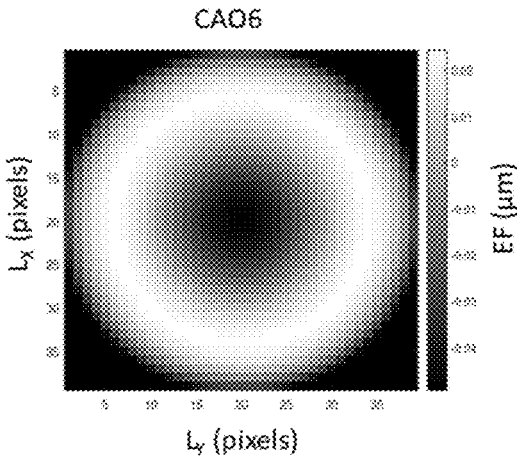
CAO6
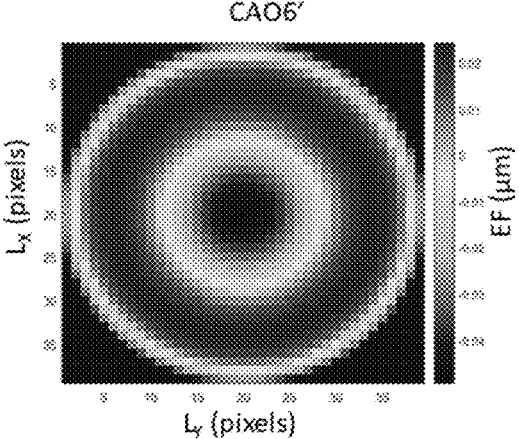
CAO6′
[Fig. 8]
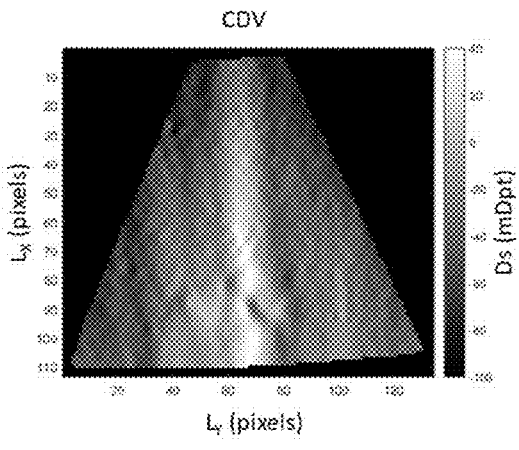
CDV
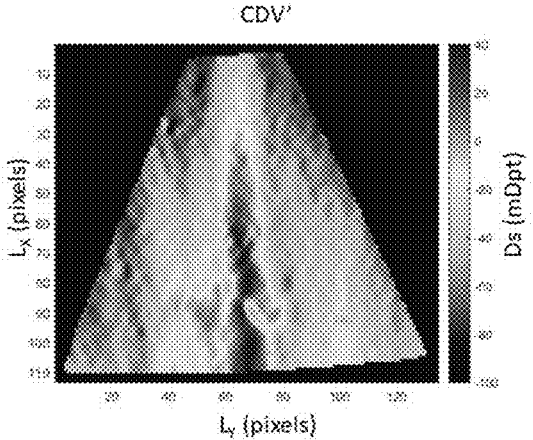
CDV′
[Fig. 9]
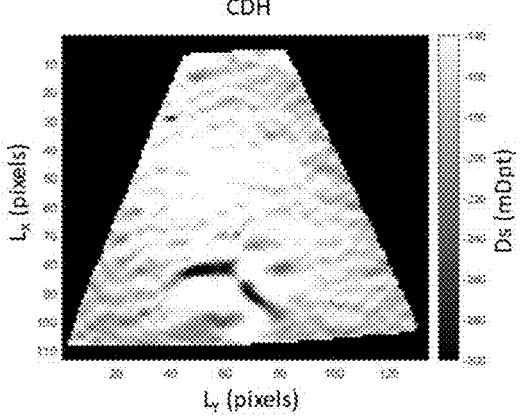
CDH
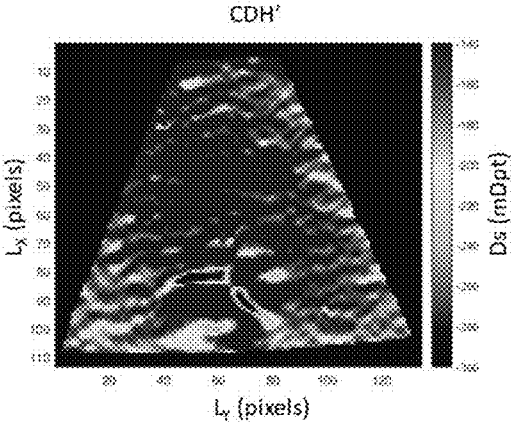
CDH′

METHOD FOR MEASURING THE OPTICAL QUALITY OF A GIVEN REGION OF A GLAZING UNIT, ASSOCIATED MEASURING DEVICE

CROSS-REFERENCE TO RELATED APPLICATIONS

This application is the U.S. National Stage of PCT/ EP2020/084606, filed Dec. 4, 2020, which in turn claims priority to French patent application number 1913869 filed Dec. 6, 2019. The content of these applications are incorporated herein by reference in their entireties.

TECHNICAL FIELD OF THE INVENTION

The technical field of the invention is that of advanced driver-assistance systems.

The present invention relates to a method and a device for measuring the optical quality of a given region of a transportation-vehicle glazing, said region being intended to be placed in the optical path of an image-acquiring device of an advanced driver-assistance system.

TECHNOLOGICAL BACKGROUND OF THE INVENTION

Transportation vehicles, in particular road vehicles, are increasingly being fitted with advanced driver-assistance systems (ADAS).

Among other functionalities, these on-board systems may provide real-time information in particular on the state of road traffic, detect and anticipate possible threats from the environment outside the vehicle, or even help the driver to perform certain difficult maneuvers, such as overtaking other vehicles or parking. To do this, these systems comprise many devices or sensors that allow in particular data on the environment around the vehicle to be collected. Certain systems, such as, for example, parking-assistance systems, autonomous-driving systems or even collision-anticipation systems, employ one or more image-acquiring devices.

The data acquired by the image-acquiring devices are processed by on-board systems to obtain the desired functionality. For example, a system for assisting with night driving allows a video of the outside environment to be displayed in real time on the dashboard of the vehicle via an infrared camera placed behind the windshield of the vehicle. An autonomous-driving system processes the images acquired by a camera placed behind the windshield of the vehicle in order to extract therefrom the data required by the unit for driving the vehicle automatically.

In order to protect the image-acquiring devices from the outside environment, these devices are most often placed inside the vehicle. The image-acquiring devices are generally placed behind one of the glazings of the vehicle, for example the windshield, the back window or even the side windows, but most often these devices are placed behind the windshield in order to acquire information from in front of the vehicle.

In order for advanced on-board systems that employ image-acquiring devices to be able to operate optimally, it is necessary for the data acquired by said devices to be reliable. From an optical point of view, positioning the image-acquiring devices behind one of the glazings of the vehicle means that the light rays received by these image-acquiring devices first pass through the glazing before reaching said devices. Thus, the glazings must have an optical quality that is sufficient to prevent the image captured by the image-acquiring device from being distorted.

However, glazings often have optical defects of varying origins. For example, image-acquiring devices, in particular those located behind the windshield, are generally placed behind inclined glazings and, in most cases, in a region of the glazing delineated by opaque elements. These opaque elements allow some of the elements of the image-acquiring devices, i.e. elements that are not active image-acquiring elements, to be hidden so that they cannot be seen from outside vehicles. However, the presence of these opaque elements, which are generally enamels, on the surface of glazings, leads to a decrease in the optical quality of the glazing in the region of the glazing bordering the opaque elements, in particular in the region of the glazing located at a distance comprised between 5 and 8 mm from the opaque elements. Moreover, in the particular case of regions delineated by enamel deposited at high temperature on glazings made of glass, differences in the coefficients of thermal expansion of or physico-chemical interactions between the materials of the enamel and the glass may cause local surface variations near their edges. These variations may for example be variations in refractive index and/or geometric deformations with respect to the rest of the area of the glass away from the edges of the enameled regions. In addition, the regions delineated by opaque elements may also contain, on their surface, functional elements that are located directly in the acquisition field of the image-acquiring devices. These functional elements may, for example, be networks of heating wires with various geometries, or even functional layers with optical or thermal properties. These functional elements also cause optical defects.

Glazings intended to be placed in front of image-acquiring devices are manufactured before the integration of these devices. It is therefore necessary to check the optical quality of the windshield, and in particular of the regions delineated by opaque elements, in order to prevent the presence of optical defects, in particular in said regions, from being the origin of detrimental artifacts in the images acquired by the image-acquiring devices.

At the present time, one of the techniques used to measure the optical quality of glazings, in particular vehicle windshields, is deflectometry. Although this measurement technique offers high repeatability, it does not allow the optical quality of glazings to be measured with precision. Specifically, this technique does not allow optical defects that degrade the quality of images captured by image-acquiring devices to be identified and quantified with precision, this technique only allowing the distortion introduced by the glazing to be measured. Furthermore, this method does not allow the optical quality of a small region of a glazing to be measured, in particular when opaque elements, such as enamels, surrounding said region are the source of optical distortions in proximity thereto. Specifically, this method has a spatial resolution such that the measurements of optical quality are limited to a segment of the area of said given region. The edges of this segment must be sufficiently far from the edges of the opaque elements of the delineated region if measurement artefacts are to be avoided.

SUMMARY OF THE INVENTION

The invention provides a solution to the aforementioned problems in that it allows the optical defects introduced by the glazing to be identified and quantified with precision, including in a given region of said glazing that is in particular delineated by opaque elements that amplify the optical defects.

A first aspect of the invention relates to a method for measuring the optical quality of a given region of a road- or rail-vehicle glazing (this region being all or some of the glazing, in particular a peripheral region and even a region along a, preferably longitudinal, edge of the glazing, or in particular the central region and/or (conventional) region of the rearview mirror), said region being intended to be positioned in the optical path of an image-acquiring device (camera), the measuring method being implemented by a measuring device comprising an emitter and a wavefront analyzer.

The measuring method according to the first aspect comprises:

a step of emitting, with the emitter, a beam of light rays in the direction of said given region, this beam preferably being a circular beam (simpler to achieve in particular with a diameter of at least 100 mm)

preferably (for an analysis in transmission) a step of returning said light beam (return beam) by means of a plane mirror placed on one side of the glazing, the emitter and wavefront analyzer then being placed on the other side of the glazing, the plane mirror preferably being circular (preferably at least 100 mm in diameter)

a step of analyzing, with the wavefront analyzer, the wavefront of the light rays transmitted by said given region, comprising:

a sub-step of generating a wavefront-error map, this map in particular being a 2D image corresponding to the projection of the so-called camera region of the glazing onto the wavefront analyzer (the sensor), a sub-step of determining, on the basis of the wavefront-error map, at least one optical-defect map, of any optical defects present in said region of the glazing (in all or some of this region, in particular in a useful region).

By virtue of the measuring method according to the invention, and in particular of the step of analyzing the wavefront, it is possible to identify and quantify optical defects with greater precision, and in particular to measure the optical aberrations, in particular the aberrations of sphericity, chromatism, astigmatism, and coma, introduced by at least one given region of a glazing. In addition, the measuring method also allows the optical quality of a given region of the glazing delineated by opaque elements to be determined with precision.

Precisely determining the optical defects, in particular the optical aberrations, introduced by the glazing allows the images captured by image-acquiring devices to be corrected in order to obtain quality images that, in the field of advanced driver-assistance systems, are key to being able to correctly interpret the environment outside the road or rail vehicle. The invention may be used for any type of photographic or vision sensor, for example a CMOS (Complementary Metal-Oxide-Semiconductor) or CDD (Charge-Coupled Device) sensor, whether integrated into an image-acquiring device in the vehicle or remote from a system for processing images supplied by the photographic sensor. The invention is very particularly suitable for glazings (windshield, back window, etc.) in autonomous or semiautonomous (road) vehicles: level L2+, L3, L4 and L5 (fully autonomous), and vehicles such as robot taxis and shuttles. The angle of the glazing, in particular if it is a road-vehicle windshield, may typically be between 21° and 36°, with respect to the ground, and on average 30°.

In addition, by virtue of the step of analyzing the wavefront of the light rays transmitted by the glazing, it is possible to access other metrics allowing the glazing to be characterized, in particular the slope of the wavefront, the optical power, the modulation transfer function or even the point spread function.

Aside from the features just mentioned in the preceding paragraph, the measuring method according to the first aspect of the invention may have one or more additional features among the following, either implemented individually or in any technically possible combination.

Preferably, the size of the beam covers a region larger than the region referred to as the camera region (or transmission window), which camera region is intended to be coupled to the camera—the coupling is generally only to one zone of this region. For example, this camera region has a width (lower base for example if trapezoidal) of at least 20 mm, 30 mm or 50 mm and better still of at most 150 mm or 100 mm and is preferably trapezoidal (upper base of smaller width than the lower base) and its height is at least 8 mm, 10 mm or even 15 mm and better still at most 60 mm or 55 mm or 30 mm or 25 mm. Thus, the beam for example has a width (diameter if circular) larger than or equal to the maximum width of the camera region, in particular a width of at least 100 mm. The coupling to the camera (the image-acquiring device) is generally to a zone of this camera region. When the useful zone seen by the camera is referred to below, what is meant is that region of the glazing (included in the camera region) which is intercepted by the field of view of the camera.

According to one non-limiting embodiment, (preferably) the emitter and the wavefront analyzer are placed on either side of the glazing or a plane mirror is placed on one side of the glazing and the emitter and wavefront analyzer are placed on the other side of the glazing, the analyzing step comprising:

a sub-step of computing a phase difference between the wavefront of the light rays transmitted by said given region of the glazing and a reference wavefront, with a view to determining a final wavefront error used to generate the wavefront-error map.

In particular according to the preceding embodiment, the analyzing step comprises:

a sub-step of generating a wavefront-slope map on the basis of said wavefront-slope map, the sub-step of computing a phase difference between the wavefront of the light rays transmitted by said given region of the glazing and a reference wavefront, with a view to determining a final wavefront error used to generate the wavefront-error map.

Alternatively, the wavefront-error map may be used to generate the wavefront-slope map.

According to one non-limiting embodiment, the measuring device comprises a plane mirror placed on one side of the glazing and the emitter and wavefront analyzer are placed on the other side of the glazing, the analyzing step comprising:

a sub-step of computing a phase difference between the wavefront of the light rays transmitted by said given region of the glazing and a reference wavefront, with a view to determining an intermediate wavefront error, a sub-step of dividing the intermediate wavefront error by two, with a view to determining a final wavefront error used to generate the wavefront-error map.

According to one non-limiting embodiment (the measuring device preferably comprising a plane mirror placed on one side of the glazing and the emitter and wavefront analyzer are placed on the other side of the glazing), the analyzing step comprises:

a sub-step of dividing the beam of light rays into four beams (by diffraction), a sub-step of generating an interferogram map, in particular captured by a wavefront sensor (of the wavefront analyzer)

on the basis of the interferogram map, on the basis of said wavefront-slope map, a sub-step of computing a phase difference between the wavefront of the light rays (FM) transmitted by said given region of the glazing and a reference wavefront (FR), with a view to determining a final wavefront error used to generate the wavefront-error map (CEC).

In particular, the analyzing step may comprise:

said sub-step of dividing the beam of light rays into four beams (by diffraction), said sub-step of generating an interferogram map, in particular captured by a wavefront sensor (of the wavefront analyzer)

a sub-step of generating a wavefront-slope map on the basis of the interferogram map, preferably by Fourier analysis on the basis of said wavefront-slope map, said sub-step of computing a phase difference between the wavefront of the light rays (FM) transmitted by said given region of the glazing and a reference wavefront (FR), with a view to determining a final wavefront error used to generate the wavefront-error map (CEC).

According to one non-limiting embodiment, said optical-defect map is chosen from the following list:

an optical-aberration map, a (wavefront-) slope map, an optical-power map, a map of point spread function, a map of modulation transfer function, a horizontal-distortion map, a vertical-distortion map.

According to one non-limiting embodiment, the analyzing step comprises:

a sub-step of selecting a useful zone in the generated wavefront-error map, which useful zone (area) is preferably circular, in particular of predetermined size, in particular at least 4 mm, and even at most 20 mm, in length (diameter)

a sub-step of decomposing said useful zone by image processing (in particular conversion of the surface of the wavefront into a sum of elementary surfaces by polynomial decomposition) into a plurality of optical-aberration maps.

The useful zone, i.e. the zone seen by the camera (the camera sensor), is preferably circular. It is for example a relatively centered region of the region referred to as the camera region, which generally takes the form of a trapezoidal window in an opaque (enamel, etc.), often black, layer deposited on a glass sheet of the glazing (laminated glazing in general) and/or on a lamination interlayer, for example one made of polyvinyl butyral (PVB). The location of the camera depends on the automobile manufacturer, and so the zone seen by the camera, which may be off-center in the camera region, and the edges of the (especially enamel) window, may impact the quality of the image of the scene.

For the sub-step of decomposing said useful region by image processing, use is preferably made of Zernike polynomials, which are well known in the field of optics. Zernike polynomials are a set of polynomial mathematical functions that are particularly suitable for the description of circular regions and which allow complex surfaces to be decomposed into an infinite sum of elementary surfaces that each correspond to one particular degree and type of optical aberration. This decomposition of the useful zone allows a plurality of optical-aberration maps to be generated. The Zernike polynomials are defined in the document published by Pierre Strock dated Mar. 7, 2008, which is accessible on the Internet (15 pages). These polynomials are defined by Wyant's expansion scheme. The polynomials are classified using two indices, n and m. The polynomials numbered 1 to 8 are in particular chosen, and even those of higher order up to 36 in particular (Wyant's expansion scheme, page 13 of the document).

According to one non-limiting embodiment, at least one of the optical-aberration maps of the plurality of optical-aberration maps, in particular of degree of at least 2, is chosen from the following list:

a focus-error map (preferably a map corresponding to the projection of the Zernike polynomial of order 3)

a map of astigmatism oriented at 0° (plane of the axes X and Y, which are normal to the axis of propagation Z of the wavefront, this map preferably corresponding to the projection of the Zernike polynomial of order 4)

a map of astigmatism oriented at 45° (plane of the axes X and Y, which are normal to the axis of propagation Z of the wavefront, this map preferably corresponding to the projection of the Zernike polynomial of order 5)

a map of X-wise coma (X perpendicular to the axis of propagation Z of the wavefront, X for example being the vertical axis, this map preferably corresponding to the projection of the Zernike polynomial of order 6)

a map of Y-wise coma (Y perpendicular to the axis of propagation Z of the wavefront and to X, Y for example being the horizontal axis, this map preferably corresponding to the projection of the Zernike polynomial of order 7)

a spherical-aberration map (preferably corresponding to the projection of the Zernike polynomials of order 4).

According to one non-limiting embodiment, the analyzing step comprises:

a sub-step of comparing the wavefront-error amplitudes (preferably in μm) of the plurality of optical-aberration maps, a sub-step of identifying at least one optical aberration having a wavefront-error amplitude higher than the wavefront-error amplitude of the other optical aberrations (with a view to identifying the dominant optical aberration(s)).

Provision may then be made, after said identifying step, to determine a correction of the image-acquiring device, in particular a correction of its position and/or to add a lens for compensating for the wavefront error introduced by the glazing, between the glazing and the image-acquiring device.

According to one non-limiting embodiment, the method comprises a step of storing said optical-defect map in a data storage device.

Moreover, the invention, according to a second aspect, relates to a device, for measuring the optical quality of at least one given region of a glazing, able to implement the measuring method according to the first aspect, comprising:

an emitter configured to emit a beam of light rays in the direction of said given region, a wavefront analyzer configured to analyze the wavefront of the light rays transmitted by said given region.

Aside from the features just mentioned in the preceding paragraph, the measuring device according to the second aspect of the invention may have one or more additional features among the following, either implemented individually or in any technically possible combination.

The wavefront analyzer preferably comprises a system based on four-wave interferometry. In particular, the wavefront analyzer comprises a diffractive grid spaced apart from a wavefront sensor. It is a modified camera in which the objective has been replaced by the diffractive grid.

According to one non-limiting embodiment, the size of the beam covers a region larger than the region referred to as the camera region (transmission window), which is intended to be coupled to the camera. For example, this region has a width (lower base) of at least 30 mm or 50 mm and at most 120 mm and is preferably trapezoidal (with an upper base of smaller width than the lower base) and its height is at least 10 mm or even 15 mm. The beam for example has a width larger than or equal to 100 mm According to one non-limiting embodiment, the emitter comprises a monochromatic light source.

According to one non-limiting embodiment, the emitter and the wavefront analyzer are configured to be placed on either side of the glazing.

According to one non-limiting embodiment, the measuring device comprises a plane mirror configured to be placed on one side of the glazing and the emitter and the wavefront analyzer are configured to be placed on the other side of the glazing.

Furthermore, the invention according to a third aspect relates to a data storage device comprising at least one optical-defect map associated with said given region of the glazing.

Aside from the features just mentioned in the preceding paragraph, the storage device according to the third aspect of the invention may have one or more additional features among the following, either implemented individually or in any technically possible combination.

According to one non-limiting embodiment, the data storage device takes the form of a data matrix.

According to one non-limiting embodiment, the data storage device takes the form of a barcode or of a data matrix that refers to a database.

According to one non-limiting embodiment, said optical-defect map is chosen from the following list:

an optical-aberration map,
    a (wavefront-) slope map,
    an optical-power map,
    a map of point spread function,
    a map of modulation transfer function,
    a horizontal-distortion map,
    a vertical-distortion map.

According to one non-limiting embodiment, the analyzing step comprises:

a sub-step of selecting, in the generated wavefront-error map, a region, called the useful region, which is preferably circular, of predetermined size (substantially corresponding to the region of the glazing captured by the image-acquiring device such as the camera sensor), the useful region in particular having a length (diameter) of at least 4 mm, in particular comprised between 4 and 20 mm a sub-step of decomposing said useful region by image processing into a plurality of optical-aberration maps, in particular by converting the surface of the wavefront into a sum of elementary surfaces by polynomial decomposition.

The region seen by the camera (the camera sensor) of the wavefront analyzer is preferably circular, for example a relatively centered region of the region referred to as the camera region, which generally takes the form of a trapezoidal window in an opaque (enamel, etc.), often black, layer deposited on a glass sheet of the (generally laminated) glazing 10 and/or on a lamination interlayer, for example one made of polyvinyl butyral (PVB).

Since the location of the camera depends on the automobile manufacturer (this is also not always the case) the edges of the (in particular enamel) window may impact the quality of the image of the scene.

According to one non-limiting embodiment, at least one of the optical-aberration maps of the plurality of optical-aberration maps, in particular of degree of at least 2, is chosen from the following list:

a focus-error map,
    a map of astigmatism oriented at 0°,
    a map of astigmatism oriented at 45°,
    a map of X-wise coma (perpendicular to the axis of propagation Z of the wavefront, X for example being the vertical axis),
    a map of Y-wise coma (perpendicular to the axis of propagation Z of the wavefront and to X, Y for example being the horizontal axis),
    a spherical-aberration map.

According to one non-limiting embodiment, the analyzing step comprises:

a sub-step of comparing the wavefront-error amplitudes (preferably in $\mu m$) of the plurality of optical-aberration maps, a sub-step of identifying at least one optical aberration having an amplitude higher than the amplitude of the other optical aberrations in order to identify the dominant optical aberration(s).

Provision may then be made, after the identifying sub-step, to determine a correction of the image-acquiring device, in particular of its position, or to add a lens for compensating for the wavefront error introduced by the glazing.

In addition, the invention according to a fourth aspect relates to a glazing, in particular for a road or rail vehicle, incorporating the data storage device according to the third aspect.

Aside from the features just mentioned in the preceding paragraph, the glazing according to the fourth aspect of the invention may have one or more additional features among the following, either implemented individually or in any technically possible combination.

According to one non-limiting embodiment, the data storage device is printed on the glazing.

According to one embodiment, the glazing comprises a sheet of transparent material and an opaque element partially covering the sheet so as to delineate a given region of the sheet.

According to one non-limiting embodiment, the sheet is made of glass.

According to one non-limiting embodiment, the sheet is made of plastic.

According to one non-limiting embodiment, the opaque element is formed by an enamel layer.

According to one non-limiting embodiment, the glazing is a road-vehicle windshield.

The invention furthermore relates to a vehicle comprising the glazing defined above, and, in the passenger compartment, a device, in particular a camera, for acquiring images, in particular of at most 5 cm of the glazing, said device being positioned to receive light radiation passing through the glazing through the camera region. The vehicle may comprise a lens for compensating wavefront error, placed between the image-acquiring device and the camera region. This lens may for example take the opposite form to the dominant aberration in order to be able to cancel (compensate for) it.

The invention and its various applications will be better understood on reading the following description and on examining the accompanying figures.

BRIEF DESCRIPTION OF THE FIGURES

The figures are given by way of indication and do not in any way limit the invention.

FIG. 1 is a schematic representation of a road-vehicle windshield comprising a given region delineated by an opaque element.

FIG. 2 is a schematic representation of an image-acquiring device placed behind the windshield of FIG. 1, so that the given region is in the optical path of the image-acquiring device.

FIG. 3 is a schematic representation of a measuring device according to one embodiment of the invention, which allows the optical quality of the given region of the windshield of FIG. 1 to be measured.

FIG. 3' is a schematic representation of the wavefront analyzer with a system based on four-wave interferometry FIG. 4 is a schematic representation in the form of a block diagram illustrating steps of a measuring method according to one embodiment of the invention, allowing the optical quality of the given region to be measured, by means of the measuring device of FIG. 3.

FIG. 5*a* is a schematic representation illustrating the wavefront error introduced by the glazing.

FIG. 5*b* is a schematic representation of the wavefront-error map generated by the wavefront analyzer of the measuring device of FIG. 3.

FIG. 6 shows a map illustrating the useful region (seen by the camera) selected in the wavefront-error map shown in FIG. 5*b*.

FIG. 7*a* shows a focus-error map generated by the wavefront analyzer of the measuring device of FIG. 3

FIG. 7*b* shows a map of 0° astigmatism, generated by the wavefront analyzer of the measuring device of FIG. 3

FIG. 7*c* shows a map of 45° astigmatism, generated by the wavefront analyzer of the measuring device of FIG. 3

FIG. 7*d* shows a map of X-wise coma, generated by the wavefront analyzer of the measuring device of FIG. 3

FIG. 7*e* shows a map of Y-wise coma, generated by the wavefront analyzer of the measuring device of FIG. 3

FIG. 7*f* shows a spherical-aberration map generated by the wavefront analyzer of the measuring device of FIG. 3

FIG. 8 shows a vertical-distortion map generated by the wavefront analyzer of the measuring device of FIG. 3.

FIG. 9 shows a horizontal-distortion map generated by the wavefront analyzer of the measuring device of FIG. 3.

Unless otherwise specified, a given element that appears in various figures has been designated with a single reference.

DETAILED DESCRIPTION

The figures are given by way of indication and do not in any way limit the invention.

The invention relates to a method and to a device for measuring the optical quality of a glazing. By "glazing", what is meant is a plate formed from a transparent material such as glass or indeed plastic. Advantageously, the glazing may be a windshield, a back window or even side windows of a road or rail vehicle.

In the rest of the description, it will be assumed that the glazing is a road-vehicle windshield.

FIG. 1 illustrates an example of a road-vehicle windshield.

With reference to FIG. 1, the windshield 10 comprises a sheet 11 of glass 11 and an opaque element 12. The opaque element 12 in particular allows elements arranged inside the vehicle, for example a portion of an image-acquiring device, to be hidden from outside said vehicle. The opaque element 12 covers at least one of the main faces of the sheet 11 of glass in such a way as to border the entire windshield 10. The opaque element 12 may be placed on the surface of only one of the two main faces of the glass sheet 11 or may comprise several segments, each of the segments being placed on either of the main faces of the glass sheet 11. In the case of multiple glazing comprising a plurality of glass sheets, such as laminated glazing, the opaque element 12 may also be formed from a plurality of segments, each segment being placed on the surface of two or more glass sheets, depending on the number of segments. Moreover, the glass sheet 11 may be inclined for example by an angle of 30°. In addition, the glass sheet 11 may be curved along one or two axes, the radius of curvature for example being between 6 m and 30 m.

Preferably, the opaque element 12 is a layer of enamel deposited on the surface of the sheet 11. Naturally, the enamel layer may be replaced by any other opaque element that allows certain elements placed inside the road vehicle to be hidden from outside. The opaque element may also be a layer on the lamination interlayer or else an opaque insert attached to the lamination interlayer.

Moreover, as may be seen in FIG. 1, the opaque element 12 delineates a given region 13 of the glass sheet 11 located on the upper border of the windshield 10. The given region 13 is intended to be placed on the optical path of an image-acquiring device, such as a camera of an advanced driver-assistance system. Preferably, the area of the given region 13 is smaller than 0.5 m².

FIG. 2 shows an image-acquiring device placed behind the windshield 10 shown in FIG. 1.

As may be seen in FIG. 2, the image-acquiring device 20 is placed behind the windshield 10 so that the given region 13 is placed on the optical path of the image-acquiring device 20, for example using a suitable holder (not illustrated). Advantageously, the image-acquiring device 20 is a high-resolution digital camera suitable for operating in the visible, i.e. at wavelengths comprised between 390 nm and 750 nm.

Advantageously, a measuring device 40 is used to determine the optical quality of that given region 13 of the windshield 10 which is in the field of view of the image-acquiring device 20.

FIG. 3 is a schematic representation of the measuring device 40 according to one embodiment of the invention.

With reference to FIG. 3, the measuring device 40 comprises an emitter 41 and a plane mirror 42 that is preferably circular (and preferably at least 100 mm in diameter). The windshield 10 is positioned between the emitter 41 (for example on the external face of the windshield) and the plane mirror 42 (for example on the internal face of the windshield), for example at a distance comprised between 200 mm and 250 mm from the emitter 41 and at a distance comprised between 250 mm and 300 mm from the plane mirror 42.

The emitter 41 is configured to emit a beam of light rays through the given region 13 of the windshield 10. To do this, the emitter 41 comprises a light source and a collimator that is placed after the light source in order to obtain a beam of, for example parallel, light rays. Advantageously, the light source of the emitter 41 is monochromatic. In addition, the light source of the emitter 41 is suitable for emitting in the visible, i.e. at wavelengths comprised between 400 nm and 700 nm, preferably between 640 nm and 660 nm. Advantageously, the size of the beam allows the entire given region 13 of the windshield 10 to be covered while guaranteeing a sufficient resolution and a flux that allows information to be obtained on the whole of the given region 13 (which is called the camera region). Preferably, the size of the beam covers a region larger than the given region 13. Thus, the circular beam here has, for example, a width larger than or equal to 100 mm, for example 130 mm here.

In addition, the measuring device 40 also comprises a wavefront analyzer, also called an aberrometer, that allows the shape of the wavefront of the beam emitted by the emitter 41 to be measured and the deformation undergone by the wavefront as it passed through the given region 13 to be determined. It will be recalled that a wavefront is the three-dimensional wave surface defined such that each light ray coming from a given light source is orthogonal to it. The wavefront analyzer measures the shape of this wave surface.

Advantageously, the wavefront analyzer is composed of a system that is based on four-wave (lateral shift) interferometry. One such system is known by the trade name "Phasics SID4-HR".

As shown in FIG. 3', this system comprises a modified Hartmann mask, in particular a diffractive grid 5 comprising a grid 51 (checkerboard, etc.) contiguous to a diffractive optic 52 through which the, preferably circular, return beam 30 (reference beam, without windshield, then measurement beam with insertion of the windshield between mirror and analyzer) propagates, causing its replication in four beams 31 to 34. The diffractive grid 50 (which replaces the camera lens) is spaced apart from the (wavefront) sensor 6 of the camera preferably by at most 9 mm. The system generates an interferogram, which is captured by the sensor 6 of the camera and which is distorted by the wavefront gradients, which are retrieved via a Fourier analysis. Insofar as the recorded interferogram is predominantly sinusoidal, a small number of pixels is required to retrieve a phase pixel. This results in an resolution that is increased (better sampling of the wavefront, allowing a greater local deformation to be measured without smoothing), at least by a factor of 4, with respect to other wavefront analyzers using the so-called Hartmann or Shack-Hartmann technique and matrix arrays of microlenses. The system according to the invention also allows a better measurement dynamic range to be achieved.

Furthermore, the plane mirror 42 is placed behind the windshield 10 in order to reflect the beam transmitted by the windshield 10. Advantageously, the, in particular circular, plane mirror 42, which is for example silver-based, is calibrated so as to represent a perfect plane, characteristic of good optical quality, i.e. to have a low deformation and a low surface roughness.

In one alternative embodiment (not illustrated), the measuring device 40 does not comprise a plane mirror 42. In this case, the emitter 41 is placed on one side of the windshield 10 while the wavefront analyzer is placed on the other side of the windshield 10.

Figure 4:
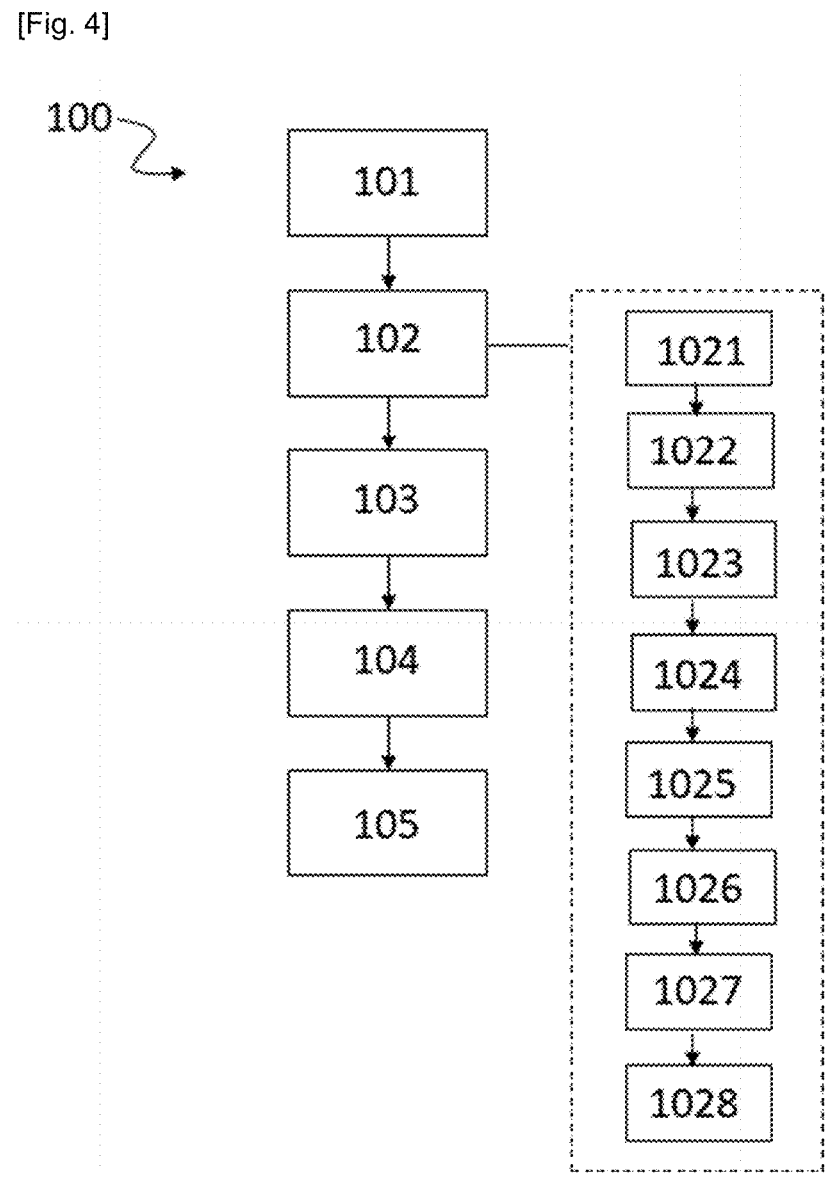

FIG. 4 is a schematic block diagram illustrating steps of the method 100 for measuring, according to one embodiment of the invention, the optical quality of the given region 13 of the windshield 10 by means of the measuring device 40 described with reference to FIG. 3.

In an emitting step 101, a beam of, preferably parallel, light rays is emitted by the emitter 41 in the direction of the given region 13 of the windshield 10. The beam then passes through the given region 13 before reaching the plane mirror 42, which reflects the beam toward the glazing 10. The beam then passes through the given region 13 of the glazing 10 a second time before reaching the wavefront analyzer.

In an analyzing step 102, the beam received by the wavefront analyzer is analyzed by its microprocessor. The wavefront-analyzing step 102 comprises a number of sub-steps.

Thus, in a computing sub-step 1021 the phase difference between the wavefront of the reflected beam and a reference wavefront is computed, with a view to determining an intermediate wavefront error. Advantageously, the reference wavefront is a plane wavefront. FIG. 5a illustrates the difference in shape between a reference wavefront FR and a measured wavefront FM, which corresponds to the wavefront error EF.

In a dividing sub-step 1022, the wavefront error is divided by two to obtain the final wavefront error. Specifically, insofar as the beam passes twice through the windshield 10, a first time on emission of the beam by the emitter 41 and a second time on reflection of the beam by the plane mirror 42, the intermediate wavefront error determined in sub-step 1021 corresponds to the wavefront error resulting from the two passages of the beam through the given region 13 of the windshield 10. Thus, sub-step 1022 allows the final wavefront error corresponding to a single passage of the beam through the given region 13 to be determined. Naturally, the dividing sub-step 1022 is not carried out when the measuring device 40 does not comprise a plane mirror 42 and when the emitter 41 and the wavefront analyzer are placed on either side of the windshield 10. Specifically, in this case, the wavefront error computed in the computing sub-step 1021 corresponds to the final wavefront error relating to a single passage of the beam through the given region 13.

In a generating sub-step 1023, a wavefront-error map is generated on the basis of the final wavefront error. The wavefront-error map maps, for example at points spaced 490 μm apart (width of a phase pixel), the deviation of the wavefront transmitted through the given region 13 with respect to the reference wavefront. FIG. 5b illustrates an example of a wavefront-error map CEC generated at the end of sub-step 1023. This wavefront error map is an image: a matrix array of phase pixels, each of 490 μm; a two-dimensional matrix array corresponding to the projection of the camera region 13 of the glazing 10 onto the wavefront analyzer. This projection is trapezoidal in shape with a lower base of 60 mm width, an upper base of 52 mm width and a height of 17 mm. On this wavefront-error map, the abscissa $L_Y$ represents the number of pixels along the Y-axis, i.e. the horizontal axis, the left ordinate $L_X$ represents the number of pixels along the X-axis, i.e. the vertical axis, and the right ordinate represents the wavefront error EF expressed in microns.

In a selecting sub-step 1024, a useful region 14 (shown in FIG. 5b) is selected in the generated wavefront-error map CEC. Advantageously, the useful region 14 is a circular region of predetermined size corresponding to the region of the glazing 10 actually seen by the image-acquiring device 20. The circular region has for example a diameter larger than or equal to 4 mm, preferably of at most 20 mm, when the camera is very close to the glazing. A map illustrating the useful region CAO0 generated at the end of the selecting sub-step 1024 is illustrated in FIG. 6.

In a decomposing sub-step 1025, the useful region 14 is decomposed into polynomials, preferably Zernike polynomials, by image processing. Zernike polynomials are a set of polynomial mathematical functions that are particularly suitable for the description of circular regions and which allow complex surfaces to be decomposed into an infinite sum of elementary surfaces that each correspond to one particular degree and type of optical aberration. This decomposition of the useful zone 14 allows a plurality of optical-aberration maps to be generated.

In a determining sub-step 1026, a plurality of optical-aberration maps, of optical aberrations that are preferably of a degree higher than or equal to 2, and that are present in the given region 13 of the glazing 100, is determined at the end of the decomposing sub-step 1025.

FIGS. 7a, 7b, 7c, 7d, 7e and 7f illustrate, in black and white and in color, examples of optical-aberration maps that may be obtained at the end of the decomposing sub-step 1025. In these optical-aberration maps, the abscissa $L_Y$ represents the number of pixels along the Y-axis, i.e. the horizontal axis, the left ordinate $L_x$ represents the number of pixels along the X-axis, i.e. the vertical axis, and the right ordinate represents the wavefront error, expressed in microns, for the optical aberration in question.

As may be seen in FIG. 7a, it is possible to obtain a first map CAO1, CAO1' illustrating an aberration of degree 2: a focus error (also called "defocus"). The first map CAO1, CAO1' is an alternation of rings. In the first map CAO1, CAO1', the wavefront-error amplitude of the optical aberration is higher at the edge, but the inverse is possible.

Furthermore, it is also possible to obtain a second map CAO2, CAO2' (shown in FIG. 7b) and/or a third map CAO3, CAO3' (shown in FIG. 7c) illustrating an aberration of degree 2: a 0° astigmatism and a 45° astigmatism, respectively. It will be recalled that astigmatism is related to a defect in glass curvature that is oriented in a direction. 0° means a difference in curvature in the x- and y-directions, this implying a different focus in these two directions. 45° astigmatism means a difference in curvature between the directions oriented at +45° and −45°.

It is also possible to obtain a fourth map CAO4, CAO4' (shown in FIG. 7d) and/or a fifth map CAO5, CAO5' (shown in FIG. 7e) illustrating an aberration of degree 3: an X-wise coma (X-wise indicating a lateral off-centeredness oriented in the X-direction) and a Y-wise coma (Y-wise indicating a lateral off-centeredness in the Y-direction).

Finally, it is possible to obtain a sixth map CAO6, CAO6' (shown in FIG. 7f) illustrating an aberration of degree 4: a spherical aberration. The sixth map CAO6, CAO6' is an alternation of rings. In the sixth map CAO6, CAO6', the wavefront-error amplitude of the optical aberration is higher at the edge, but the inverse is possible.

In a comparing sub-step 1027, the amplitudes of the plurality of optical aberrations illustrated in the optical-aberration maps are compared with one another. It will be noted that the higher the wavefront-error amplitude of the optical aberration, the more said optical aberration is dominant and must be corrected.

In an identifying sub-step 1028, at least one optical aberration among the plurality of optical aberrations is identified as having a wavefront-error amplitude higher than the amplitude of the other optical aberrations. In the case of the given region 13 of the glazing 10, it is the focus error illustrated in the maps CAO1, CAO1' and the 0° astigmatism illustrated in the maps CAO2, CAO2' that have the highest wavefront-error amplitudes.

In an establishing step 103, said optical-aberration map established in sub-step 1025 is stored in a data storage device. Advantageously, the storing step 103 may include recording certain items of information relating to the windshield 10, for example its composition, its date of manufacture, etc. Preferably, the data storage device takes the form of a data matrix. The data storage device may also take the form of a bar code, for example a flash code, a "TAGs" or a QR code, that refers to a database. Naturally, the data storage device may take another form, for example a hard disk, a storage server, an electronic memory, etc.

In a step 104, the data storage device is encrypted. The encrypting step 104 may be performed using any known suitable encryption algorithm. A specific reader will then be able to be used to unlock the data storage device and access at least some of the data that it contains.

In a step 105, the data storage device is positioned or even printed on the windshield 10. The printing step 105 is for example carried out by etching and/or by inkjet printing.

By virtue of the optical-aberration maps obtained using the measuring method 100 according to the invention, it is possible to discriminate between the various forms of aberrations present in a given region 13 scanned by the field of view of an image-acquiring device 20 placed behind the glazing 10 of the road vehicle.

Naturally, the invention is not limited to the various embodiments that have been described, and variant embodiments are possible.

Thus, alternatively to or preferably cumulatively with the optical-aberration maps, it is possible, by virtue of the measuring method 100 according to the invention, to generate other maps allowing the optical quality of the given region 13 of the glazing 10 to be characterized. For example, it could be a question of a wavefront-slope map that corresponds to the first derivative of the wavefront-error map CEC, of an optical-power map that corresponds to the second derivative of the wavefront-error map CEC, of a map of the point spread function by computing the modulus squared of the Fourier transform of the generalized pupil function or even a map of the modulation transfer function by taking the modulus of the Fourier transform of the point spread function. The wavefront-slope map may alternatively be used to generate the wavefront-error map Moreover, again alternately to or preferably cumulatively with the optical-aberration maps, it is possible to obtain a vertical-distortion map or even a horizontal-distortion map. Thus, FIG. 8 illustrates an example of a vertical-distortion map in black and white CDV and in color CDV', while FIG. 9 illustrates an example of a horizontal-distortion map in black and white CDH and in color CDH'. In these distortion maps, the abscissa represents the number of pixels along the Y-axis, i.e. the horizontal axis, the left ordinate represents the number of pixels along the X-axis, i.e. the vertical axis, and the right ordinate represents the distortion Ds expressed in millidiopters.

It will be noted that the generalized pupil function P of the exit pupil may be determined from the wavefront-error map CEC using the following equation:

$$P = e^{-i\frac{2\pi}{\lambda}EF} \qquad \text{[Math. 1]}$$

It will also be noted that the point spread function and the modulation transfer function may easily be deduced from the above equation by applying a discrete Fourier transform to the generalized pupil function P of the exit pupil, according to the following equations:

$$FEP=\|TFD(P)\|^2 \qquad \text{[Math. 2]}$$

$$FTM=\|TFD(FEP)\| \qquad \text{[Math. 3]}$$

The invention claimed is:

1. A method for measuring an optical quality of a region of a glazing of a road or rail vehicle, said region being intended to be positioned in an optical path of an image-acquiring device, the measuring method being implemented by a measuring device comprising an emitter and a wavefront analyzer, the measuring method comprising:

emitting, with the emitter, a beam of light rays in a direction of said region;

analyzing, with the wavefront analyzer, the wavefront of the light rays transmitted by said region, the analyzing comprising:

generating a wavefront-error map, determining, on the basis of the wavefront-error map, at least one optical-defect map, of any optical defects present in said region of the glazing, wherein the analyzing further comprises:

dividing the beam of light rays into a plurality of beams, generating an interferogram map, and on the basis of the interferogram map, computing a phase difference between the wavefront of the light rays transmitted by said region of the glazing and a reference wavefront, with a view to determining a final wavefront error used to generate the wavefront-error map, and wherein in the dividing, the wavefront of the beam of light rays transmitted by said region is made to propagate through a diffractive grid spaced apart from a wave-front sensor of the wavefront analyzer so that the beam of light rays is divided by diffraction, the diffractive grid comprising a grid and a diffractive optic contiguous to the grid.

2. The measuring method as claimed in claim 1, wherein the emitter and the wavefront analyzer are placed on either side of the glazing or the measuring device comprises a plane mirror placed on one side of the glazing and the emitter and wavefront analyzer are placed on the other side of the glazing; the analyzing comprising:

computing a phase difference between the wavefront of the light rays transmitted by said region of the glazing and a reference wavefront, with a view to determining a final wavefront error used to generate the wavefront-error map.

3. The measuring method as claimed in claim 2, further comprising:

generating a wavefront-slope map, and on the basis of said wavefront-slope map, computing a phase difference between the wavefront of the light rays transmitted by said region of the glazing and a reference wavefront, with a view to determining a final wavefront error used to generate the wavefront-error map.

4. The measuring method as claimed in claim 1, wherein the measuring device comprises a plane mirror placed on one side of the glazing and wherein the emitter and the wavefront analyzer are placed on the other side of the glazing, the measuring method comprising returning said light beam.

5. The measuring method as claimed in claim 1, wherein the measuring device comprises a plane mirror placed on one side of the glazing and wherein the emitter and the wavefront analyzer are placed on the other side of the glazing, the analyzing comprising:

computing a phase difference between the wavefront of the light rays transmitted by said region of the glazing and a reference wavefront, with a view to determining an intermediate wavefront error;

dividing the intermediate wavefront error by two, with a view to determining a final wavefront error used to generate the wavefront-error map.

6. The measuring method as claimed in claim 1, wherein said optical-defect map is chosen from at least one of the maps in the following list:

an optical-aberration map, a slope map, an optical-power map, a map of point spread function, a map of modulation transfer function, a vertical-distortion map, a horizontal-distortion map.

7. The measuring method as claimed in claim 1, wherein the analyzing comprises:

selecting a useful region in the generated wavefront-error map, decomposing said useful region by image processing into a plurality of optical-aberration maps.

8. The measuring method as claimed in claim 7, wherein at least one of the optical-aberration maps of the plurality of optical-aberration maps is chosen from the following list:

a focus-error map, a map of astigmatism oriented at 0°, a map of astigmatism oriented at 45°, a map of X-wise coma, a map of Y-wise coma, a spherical-aberration map.

9. The measuring method as claimed in claim 7, wherein the analyzing step comprises:

comparing wavefront-error amplitudes of the plurality of optical-aberration maps, and identifying at least one optical aberration having a wavefront-error amplitude higher than wavefront-error amplitudes of the other optical aberrations.

10. The measuring method as claimed in claim 1, further comprising storing said optical-defect map in a data storage device.

11. A device for measuring the optical quality of at least one region of a glazing, comprising:

the emitter configured to emit a beam of light rays in the direction of said region, and the wavefront analyzer configured to analyze the wavefront of the light rays transmitted by said region, wherein the device is configured to implement the method of claim 1.

12. The measuring device as claimed in claim 11, wherein the wavefront analyzer comprises a system based on four-wave interferometry.

13. The measuring device as claimed in claim 11, comprising a plane mirror configured to be placed on one side of the glazing and wherein the emitter and the wavefront analyzer are configured to be placed on the other side of the glazing.

14. The measuring method as claimed in claim 1, wherein the plurality of beams is four beams.

* * * * *